(12) United States Patent
Cambois

(10) Patent No.: US 11,892,583 B2
(45) Date of Patent: Feb. 6, 2024

(54) ONSHORE SEPARATED WAVE-FIELD IMAGING

(71) Applicant: Abu Dhabi National Oil Company, Abu Dhabi (AE)

(72) Inventor: Guillaume Cambois, Abu Dhabi (AE)

(73) Assignee: Abu Dhabi National Oil Company, Abu Dhabi (AE)

( * ) Notice: Subject to any disclaimer, the term of this patent is extended or adjusted under 35 U.S.C. 154(b) by 237 days.

(21) Appl. No.: 16/924,359

(22) Filed: Jul. 9, 2020

(65) Prior Publication Data
US 2021/0011186 A1    Jan. 14, 2021

Related U.S. Application Data

(60) Provisional application No. 62/872,268, filed on Jul. 10, 2019.

(51) Int. Cl.
*G01V 1/00* (2006.01)
*G01V 1/36* (2006.01)

(52) U.S. Cl.
CPC ...... *G01V 1/368* (2013.01); *G01V 2210/1425* (2013.01); *G01V 2210/51* (2013.01); *G01V 2210/677* (2013.01)

(58) Field of Classification Search
USPC .......................................................... 367/46
See application file for complete search history.

(56) References Cited

U.S. PATENT DOCUMENTS

| | | | | |
|---|---|---|---|---|
| 6,678,207 B2* | 1/2004 | Duren | ............... | G01V 1/364 181/112 |
| 7,453,765 B2* | 11/2008 | Ikelle | .............. | G01V 1/30 367/24 |
| 7,616,523 B1* | 11/2009 | Tabti | ............... | G01V 1/3808 367/21 |
| 7,768,869 B2* | 8/2010 | van den Berg | ......... | G01V 1/38 367/24 |
| 7,791,981 B2* | 9/2010 | Kiyashchenko | ....... | G01V 1/303 367/73 |
| 7,835,225 B2* | 11/2010 | Sollner | ............... | G01V 1/364 367/24 |

(Continued)

FOREIGN PATENT DOCUMENTS

WO    2019-035967 A1    2/2019

OTHER PUBLICATIONS

International Search Report and Written Opinion issued by Austrian Patent Office for corresponding International Patent Application No. PCT/IB2020/056504 dated Oct. 16, 2020.

(Continued)

*Primary Examiner* — James R Hulka
(74) *Attorney, Agent, or Firm* — Renner, Otto, Boisselle & Sklar, LLP

(57) ABSTRACT

A method for applying separated wave-field imaging onshore (1) by artificially creating up-going and down-going fields and (2) by using these fields in a migration algorithm. If there are any surface multiples in the data, the resulting image created using the migration algorithm will be distorted by the unknown free-surface reflection coefficient. In fact, the surface multiples may be generated with a complex series of reflection coefficients. The distortions found in the resulting image created using the migration algorithm are then removed.

7 Claims, 3 Drawing Sheets

(56) References Cited

U.S. PATENT DOCUMENTS

| | | | | |
|---|---|---|---|---|
| 7,872,942 B2* | 1/2011 | Sollner | G01V 1/38 | 367/24 |
| 7,929,373 B2* | 4/2011 | Barr, Jr. | G01V 1/3808 | 367/24 |
| 8,274,858 B2* | 9/2012 | Riyanti | G01V 1/364 | 367/24 |
| 8,339,896 B2* | 12/2012 | Van Borselen | G01V 1/362 | 367/24 |
| 8,570,831 B2* | 10/2013 | Teague | G01V 1/364 | 367/24 |
| 8,743,656 B2* | 6/2014 | Herrmann | G01V 1/00 | 367/50 |
| 10,401,517 B2* | 9/2019 | Lu | G01V 1/345 | |
| 2003/0048696 A1 | 3/2003 | Duren | | |
| 2006/0250890 A1* | 11/2006 | van den Berg | G01V 1/38 | 367/24 |
| 2007/0214663 A1* | 9/2007 | Pica | G01V 1/36 | 33/1 HH |
| 2007/0274155 A1* | 11/2007 | Ikelle | G01V 1/36 | 367/38 |
| 2008/0089174 A1* | 4/2008 | Sollner | G01V 1/3808 | 367/21 |
| 2008/0162051 A1 | 7/2008 | Ikelle | | |
| 2008/0253227 A1* | 10/2008 | Sollner | G01V 1/36 | 367/21 |
| 2009/0251992 A1* | 10/2009 | van Borselen | G01V 1/20 | 367/24 |
| 2010/0091610 A1* | 4/2010 | Sollner | G01V 1/38 | 367/24 |
| 2010/0124149 A1* | 5/2010 | Barr, Jr. | G01V 1/364 | 367/24 |
| 2010/0135114 A1 | 6/2010 | Teague et al. | | |
| 2010/0161235 A1 | 6/2010 | Ikelle | | |
| 2010/0329079 A1* | 12/2010 | Hegge | G01V 1/364 | 367/53 |
| 2011/0110189 A1* | 5/2011 | Riyanti | G01V 1/3808 | 367/24 |
| 2011/0134718 A1* | 6/2011 | van Borselen | G01V 1/364 | 367/24 |
| 2012/0039149 A1* | 2/2012 | van Borselen | G01V 1/364 | 367/24 |
| 2012/0063266 A1* | 3/2012 | Hardage | G01V 1/284 | 367/43 |
| 2012/0163121 A1* | 6/2012 | Hardage | G01V 1/38 | 367/21 |
| 2013/0201792 A1* | 8/2013 | Douma | G01V 1/38 | 367/24 |
| 2013/0329520 A1* | 12/2013 | van Borselen | G01V 1/28 | 367/24 |
| 2014/0379266 A1* | 12/2014 | Jiao | G01V 1/36 | 702/17 |
| 2016/0178772 A1* | 6/2016 | Carter | G01V 1/282 | 702/17 |
| 2016/0238726 A1 | 8/2016 | Lu et al. | | |
| 2016/0349390 A1* | 12/2016 | Hardage | G01V 1/286 | |
| 2018/0106916 A1* | 4/2018 | Hardage | G01V 1/286 | |
| 2019/0137643 A1* | 5/2019 | Sollner | G01V 1/282 | |
| 2020/0191985 A1* | 6/2020 | Kristiansen | G01V 1/30 | |

OTHER PUBLICATIONS

Richard C. Selley, "Elements of Petroleum Geology," 1998, Second Edition, USA Academic Press, p. 96-103.

Norman J. Hyne, Ph.D., "Nontechnical Guide to Petroleum Geology, Exploration, Drilling, and Production," 2001, Second Edition, PennWell Corporation, US, p. 213-22.

First Search and Examination Report issued by the Patent Office of the United Arab Emirates for the corresponding Emirati Patent Application No. P6000047/2022, dated Aug. 22, 2023.

* cited by examiner

ONSHORE SEPARATED WAVE-FIELD IMAGING

This application claims priority to U.S. Provisional Patent Application No. 62/872,268 filed on Jul. 10, 2019, which is incorporated herein by reference in its entirety.

TECHNICAL FIELD

The present disclosure relates generally to seismic imaging and more particularly to using surface generated multiples to image onshore subsurface structures.

BACKGROUND

Until recently, subsurface imaging in the oil and gas industry was performed using exclusively primary energy. Multiples, caused by reflection of seismic waves at the surface (e.g., the air-water boundary when imaging offshore), are always present in seismic data and were considered undesirable noise. A lot of time and effort was spent in data processing to remove multiples from the acquired seismic data. However, new algorithms have been developed that make use of surface-related multiples to improve subsurface imaging. These new algorithms (also referred to as migration algorithms) use the separated full seismic wave-field into up-going and down-going waves and apply a deconvolution imaging condition in the ensuing migration (which directly maps to reflectivity). Indeed, because upgoing and down-going waves share the same source and receiver wavelets and the same multiples, the multiples are automatically eliminated by the deconvolution and the results are zero-phase and true amplitude. Further, amplitude variations with angle and azimuth can be accounted for by outputting angle-dependent and azimuth-dependent image gathers.

The up-going and down-going waves are separated in some instances below the sea-surface using dual-sensor devices. Dual-sensor devices are able to differentiate between up-going and down-going waves by using two sensors that are measuring different attributes. For example, (1) hydrophones measure pressure, which is the sum of up- and down-going waves and (2) vertical geophones measure vertical particle velocity, which differentiates up- and down-going waves. Hence, up- and down-going waves can be reconstructed by summing and subtracting properly calibrated hydrophone and vertical geophone records.

Applying the above-described migration algorithms to marine data (which have strong sea-surface multiples) that has been separated into up-going and down-going waves has resulted in enhanced subsurface imaging. The marine data was enhanced not by simply removing multiples, but by using the primary and multiple signals that sample the subsurface in different yet complementary ways.

Imaging using surface multiples is not limited to using dual sensors, but can also be performed using conventional seismic data. Conventional hydrophone sensors cannot separate the seismic records into up- and down-going waves. To circumvent the issue, such data may be de-ghosted using processing methods (akin to spectral shaping) to approximate the up-going wave, and then use the estimated ghost (difference between original and de-ghosted data) as the down-going wave.

The above-described techniques are limited in that they typically only work if both the multiple and the associated primary are recorded by the receiver spread (which may not be the case for out-of-plane or up-dip reflectors). Consequently, the depth of investigation using surface multiples is often limited to the acquisition spreads. Conventional narrow-azimuth acquisition spreads are typically one to two kilometer wide, which means that imaging using surface multiples would only be accurate down to that depth. On the other hand, wide-azimuth surveys (which involve multiple source and receiver vessels) can provide accurate surface multiple images down to eight kilometers or more.

More recently, multi-component ocean-bottom seismic (OBS) (e.g., using cables or nodes) has been used in surface multiple imaging. In multi-component OBS, wave-field separation may be achieved at the sea-bottom via dual-sensor summation. Separated wave-field imaging is then achieved by invoking reciprocity so that every source becomes a secondary receiver. The larger and denser source patch compared to the receiver patch combined with the intrinsic split-spread and wide-azimuth nature of OBS acquisition provides much enhanced subsurface imaging down to greater depths.

SUMMARY

Seismic surveys are designed to illuminate the targets at depth. In doing so, the surveys neglect to image the near-surface. However, the near-surface is often heterogeneous and complicated, especially onshore. The near surface distorts the waves passing through it and alters the image of the deep target. These effects cannot be compensated for, because the near-surface cannot be imaged properly. The inability to image the near-surface is a concern due to shallow karstic collapses and meandering channels in some terrain, which can have consequences when drilling. The inability to image the near surface is also an issue when drilling shallow targets, such as clinoforms or biogenic gas that are not currently imaged properly.

The current solution for shallow seismic imaging is to acquire data with a much finer grid. Shorter receiver and source line separation improves near-surface imaging. But, the cost of such acquisition increases dramatically. Separated Wave-field Imaging may provide the desired near-surface imaging without increasing acquisition cost.

According to the present invention, separated wave-field imaging onshore is applied (1) by artificially creating up-going and down-going fields and (2) by using these fields in a migration algorithm. If there are any surface multiples in the data, the resulting image created using the migration algorithm will be distorted by the unknown free-surface reflection coefficient. In fact, the surface multiples may be generated with a complex series of reflection coefficients. The distortions found in the resulting image created using the migration algorithm are then removed.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

Separated wave-field imaging has not been applied onshore because surface-related multiples are not as severe in land data and because the recorded data cannot be separated in up-going and down-going wave-fields since we only record the vertical velocity with geophone sensors. The present invention provides a method for performing onshore separated wave-field imaging. The method includes calculating approximate up- and down-going wave-fields and applying separated wave-field imaging to collected data to generate an image. The image is then analyzed to determine if surface multiples are included in the data. When surface multiples are found in an onshore image, specific process are applied to the data to remove the distortions. For example, external data can be used (such as the output of the sweep electronic control systems, near-surface measurements, surface-consistent spectral decomposition or surface-wave inversion) to better predict the surface-related multiple response.

Figure 1:
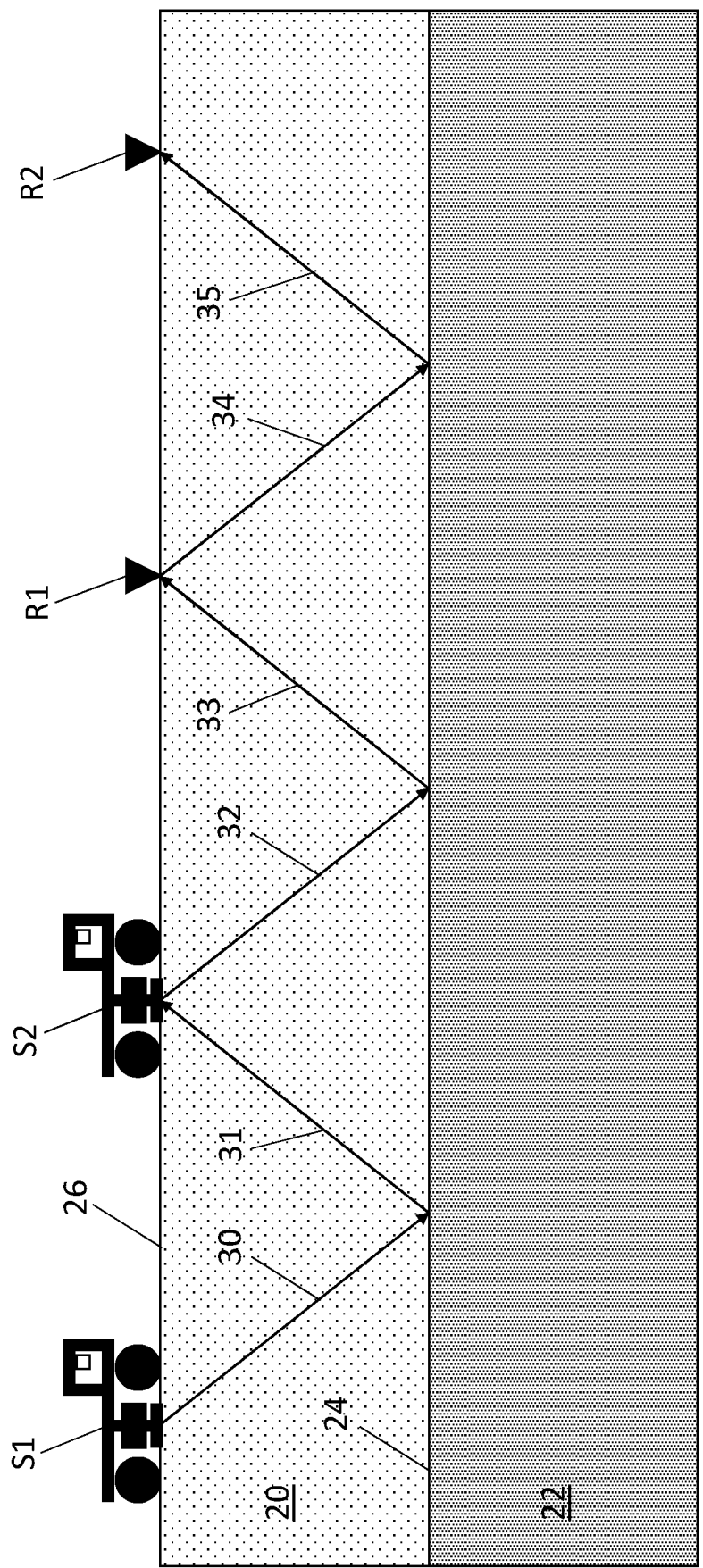
FIG. 1 is an exemplary system for performing separated wave-field imaging.

FIG. 1 shows an exemplary system for performing onshore separated wave-field imaging. The system comprises a first seismic source S1, a second seismic source S2, a first receiving sensor R1 and a second receiving sensor R2. The seismic sources S1, S2 and the receiving sensors R1, R2 are each located at different surface locations on the surface 26.

In the shown generalized embodiment the earth formation comprises two different geological structures 20, 22 separated by a boundary 24 in-between.

The seismic source S1 at a first location issues a first down-going wave 30. The first down-going wave 30 is reflected at the boundary 24 between the different geological structures 20, 22. The reflected up-going wave 31 propagates to the second seismic source S2, as shown by the respective ray paths 30, 31.

Surface 26 again reflects the up-going wave 31 which becomes a second down-going wave 32. This second down-going wave 32 is again reflected at the boundary 24 to become a second up-going wave 33.

This second up-going wave 33 is received by the first receiving sensor R1 and further reflected by surface 26 to become the third down-going wave 34. This third down-going wave 34 is again reflected at the boundary 24 to become a third up-going wave 35.

This third up-going wave 35 is received by the second receiving sensor R2.

The second seismic source S2 may further issue a down-going wave that follows the same path as down-going wave 32 and up-going wave 33 to be recorded at receiving sensor R1.

With such a system the ray path from the second seismic source S2 to the first receiving sensor R1 is a primary reflection. The ray path 30, 31, 32, 33 from the first seismic source S1 to the first receiving sensor R1 is a multiple of the primary reflection, with a bounce at the surface location of second seismic source S2.

A deconvolution of the multiple ray path by the primary ray path results in a ray path from the first seismic source S1 to the second seismic source S2, which means that the second seismic source S2 has been transformed into a virtual receiver.

The ray path 32, 33, 34, 35 from the second seismic source S2 to the second receiving sensor R2 is also a multiple of the primary reflection, with a bounce at the surface location of the first receiving sensor R1.

A deconvolution of the multiple ray path by the primary ray path results in a ray path 34, 35 from the first receiving sensor R1 to the second receiving sensor R2, which means that the first receiving sensor R1 has been transformed into a virtual source.

In an exemplary embodiment, the present invention includes performing onshore separated wave-field imaging which can be summarized as below:
1. Artificially creating up-going and down-going fields and using them in a migration algorithm.
2. Creating an image.
3. Analyzing the image for indication on the presence of surface multiples.
4. When surface multiples are found in the land data, determining that the generated image is distorted by the unknown free-surface reflection coefficient.
5. Removing these distortions by evaluating the free-surface reflection statistically and by using external data (such as the output of the sweep electronic control systems, near-surface measurements, surface-consistent spectral decomposition or surface-wave inversion) to better predict the surface-multiple response.

As part of evaluating the free-surface reflection statistically, the reflection coefficient of the land surface may be measured and an algorithm may be used to interpret the collected data and to generate an image of onshore subsurface.

When determining algorithm parameters for a particular location, high resolution tests may be performed and the seismic data generated from the high resolution tests may be decimated gradually to identify an optimum design in terms of cost/benefit.

Separated wave-field imaging typically requires access to both up-going and down-going waves, which are conventionally not available independently onshore since the data are recorded with vertical velocity sensors only. For example, wave-field separation onshore may require either a dual-sensor acquisition (with hydrophones somehow coupled to the ground and buried) or vertical antennas in shallow holes, which is often not practical. However, up- and down-going wave-fields can be approximated using the simplistic free-surface assumption, which means that the surface-related reflection coefficient is equal to −1. The same free-surface assumption is made offshore when there is no access to dual-sensor recordings. Under this hypothesis, the pressure field at the surface should be zero, which means the up-going wave is equal to the opposite of the down-going wave. The vertical velocity, which is the difference of up- and down-going wave, is then equal to twice the up-going wave. We may then use land data to simulate up- and down-going waves as follows:
1—Up=½ recorded data
2—Down=−Up
3—Apply existing separated wave-field imaging techniques If the data does not contain surface multiples, the result of the sequence above should result in a −1 at time zero (the multiple generator artificially introduced). However, if there are surface multiples in the data, subsurface structures should appear in the image. The signal-to-noise ratio may be low (depending on the strength of the surface multiple) and a residual wavelet may be present due to a simplification of the surface multiple generator (i.e., the surface multiple generator is often more complicated than the −1 used for offshore data). But, these issues may be compensated for using more sophisticated techniques to alter and/or vary the conversion factor to simulate down-going waves from the up-going waves. Similarly, techniques may also be used to improve the signal to noise ratio.

Figure 2:
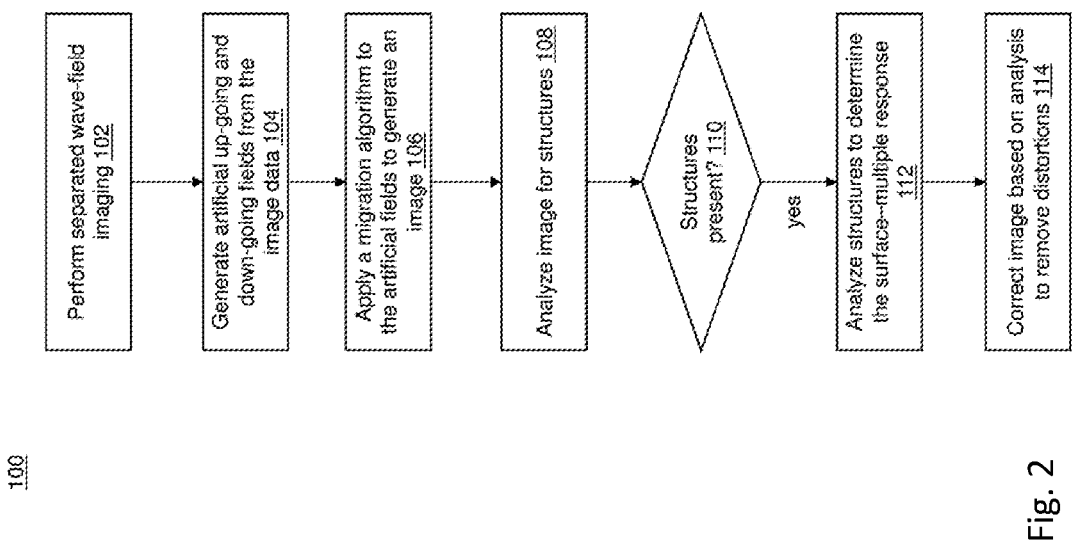
FIG. 2 is a flow diagram depicting an exemplary method for performing onshore separated wave-field imaging.

An exemplary method 100 for performing surface corrected multiple elimination is shown in FIG. 2. In action block 102, separated wave-field imaging is performed to collected imaging data. The separated wave-field imaging may be performed without using dual sensors so that up-going and down-going waves are not differentiated in the collected data. In action block 104, artificial up-going and down-going field are generated from the collected data. In action block 106, a migration algorithm is applied to the artificial fields to generate an image. In action block 108, the generated image is analyzed for structures.

Processing moves from decision block 110 to action block 112 if structures are found in the generated image. In action block 112, the structures are analyzed to determine the actual surface-multiple response present in the environment when the data was collected. In action block 114, the image is corrected based on the analysis of the structures to remove distortions introduced by the actual multiple generators.

Figure 3:
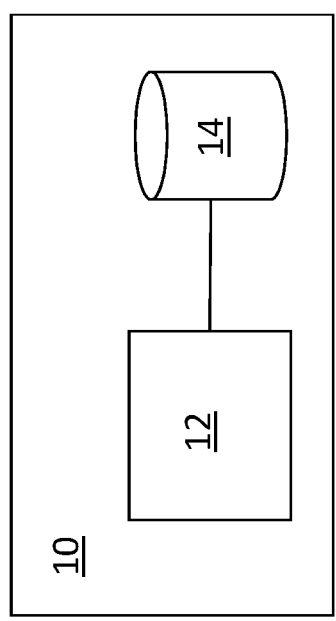
FIG. 3 is an exemplary device for performing onshore separated wave-field imaging.

As shown in FIG. 3, the invention also provides a device 10 for performing onshore separated wave-field imaging. The device 10 includes circuitry 12 (e.g., a processor) configured to perform onshore separated wave-field imaging as described above and memory 14 (e.g., a non-transitory computer readable medium) configured to store the collected imaging data.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method comprising:
iteratively performing, using a dual-sensor device, onshore separated wave-field imaging, wherein the dual-sensor device is disposed on an onshore surface and comprises:
 a plurality of seismic sources including a first seismic source and a second seismic source located adjacent to the first seismic source, the plurality of seismic sources positioned at a first location on the onshore surface;
 a plurality of receiving sensors including a first receiving sensor and a second receiving sensor located adjacent to the first receiving sensor, the plurality of receiving sensors positioned at a second location on the onshore surface, wherein:
  the first location is dissimilar to the second location;
  the plurality of seismic sources is configured to issue one or more waves; and
  the plurality of receiving sensors is configured to receive one or more waves issued by the plurality of seismic sources, wherein:
   a first ray path is defined from the second seismic source to the first receiving sensor by one or more waves issued from the second seismic source to the first receiving sensor, the first ray path defining a primary reflection;
   a second ray path is defined from the second seismic source to the second receiving sensor, the second ray path being a multiple of the primary reflection and having a bounce at a location of the first receiving sensor on the onshore surface;
collecting data representative of a boundary beneath the onshore surface using the plurality of seismic sources and the plurality of receiving sensors;
performing, by a processor configured to execute instructions encoded within computer readable media accessible to the processor, onshore separated wave field imaging on the data, wherein performing onshore separated wave field imaging comprises:
 calculating, by the processor, up-going and down-going fields from the data for the first ray path;
 generating, by the processor, an image that is representative of the boundary and a free-surface reflection by applying a separated wave-field migration algorithm with a deconvolution imaging condition to the calculated up-going and down-going fields, the deconvolution imaging condition comprising:
  transforming, by the processor, the second seismic source into a virtual receiver based on deconvolution of the second ray path by the first ray path; and
  transforming, by the processor, the first receiving sensor into a virtual source based on deconvolution of the second ray path by the first ray path;

determining, by the processor, whether the image is distorted by a distortion caused by a free-surface reflection coefficient associated with the multiple; and subtracting, by the processor, the distortion from the image by evaluating the free-surface reflection statistically using the data and through applying the separated wave-field migration algorithm.

2. The method of claim 1, wherein calculation of up-going and down-going fields from the data comprises:
identifying ½ of the data as the up-going field; and
identifying a negative ½ of the data as the down-going field.

3. The method of claim 1, wherein the data comprises an output of a sweep electronic control system used when performing onshore data collection.

4. The method of claim 1, wherein the data comprises in-situ field measurements including near-surface measurements.

5. A method for performing onshore wave field imaging comprising:
in a first iteration, performing the method of claim 1, wherein the data is collected using the plurality of seismic sources and the plurality of receiving sensors;
interchanging positions of at least some of the plurality of seismic sources with at least some of the plurality of receiving sensors; and
in a second iteration, performing the method of any claim 1, wherein the data is collected using at least some of the plurality of seismic sources and at least some of the plurality of receiving sensors in their respective interchanged positions.

6. The method of claim 5, further comprising generating an improved image of the boundary by combining images obtained by the first iteration and the second iteration.

7. A device for performing onshore separated wave-filed imaging, the device comprising:
a communication interface configured to receive data collected by wave field imaging, wherein wave field imaging is performed onshore;
a memory communicatively connected to the communication interface, the memory comprising a non-transitory computer readable medium configured to:
iteratively perform, using a dual-sensor device, onshore separated wave-field imaging, wherein the dual-sensor device is disposed on an onshore surface and comprises:
a plurality of seismic sources including a first seismic source and a second seismic source located adjacent to the first seismic source, the plurality of seismic sources positioned at a first location on the onshore surface;
a plurality of receiving sensors including a first receiving sensor and a second receiving sensor located adjacent to the first receiving sensor, the plurality of receiving sensors positioned at a second location on the onshore surface, wherein:
the first location is dissimilar to the second location;
the plurality of seismic sources is configured to issue one or more waves; and
the plurality of receiving sensors is configured to receive one or more waves issued by the plurality of seismic sources, wherein:
a first ray path is defined from the second seismic source to the first receiving sensor by one or more waves issued from the second seismic source to the first receiving sensor, the first ray path defining a primary reflection;
a second ray path is defined from the second seismic source to the second receiving sensor, the second ray path being a multiple of the primary reflection and having a bounce at a location of the first receiving sensor on the onshore surface;
collect data representative of a boundary beneath the onshore surface using the plurality of seismic sources and the plurality of receiving sensors;
perform onshore separated wave field imaging, which comprises:
calculating up-going and down-going fields from the data for the first ray path;
generating an image that is representative of the boundary and a free-surface reflection by applying a separated wave-field migration algorithm with a deconvolution imaging condition to the calculated up-going and down-going fields, the deconvolution imaging condition comprising:
transforming the second seismic source into a virtual receiver based on deconvolution of the second ray path by the first ray path; and
transforming the first receiving sensor into a virtual source based on deconvolution of the second ray path by the first ray path;
determine whether the image is distorted by a distortion caused by a free-surface reflection coefficient associated with the multiple; and
subtract the distortion from the image by evaluating the free-surface reflection statistically using the data and through applying the separated wave-field migration algorithm.

* * * * *